United States Patent
Casey

[11] 3,897,805
[45] Aug. 5, 1975

[54] THREE-WAY LEVER CONTROL FOR ACTUATING A PLURALITY OF VALVES

[75] Inventor: Robert Casey, Washington, Ill.

[73] Assignee: Caterpillar Tractor Co., Peoria, Ill.

[22] Filed: Sept. 21, 1973

[21] Appl. No.: 399,631

Related U.S. Application Data

[62] Division of Ser. No. 265,427, June 23, 1972, Pat. No. 3,795,280.

[52] U.S. Cl. ......... 137/637; 74/471 XY; 137/636.2; 251/131
[51] Int. Cl.² ................. F16K 11/18; G05G 9/04
[58] Field of Search ............. 137/636, 636.2, 636.4, 137/637; 251/131; 172/803, 804; 180/77 H, 77 HT; 200/61.86; 37/DIG. 7; 74/471 XY, 879

[56] References Cited
UNITED STATES PATENTS

| | | | |
|---|---|---|---|
| 1,822,338 | 9/1931 | Clemens | 137/637 |
| 2,224,725 | 12/1940 | Felt | 172/804 |
| 2,705,971 | 4/1955 | Dorkins | 137/636.2 |
| 3,388,609 | 6/1968 | Miller | 74/471 |
| 3,589,242 | 6/1971 | Peterson et al. | 91/413 |
| 3,700,044 | 10/1972 | Berg | 172/804 |
| 3,705,631 | 12/1972 | Seaberg | 172/804 |

Primary Examiner—Martin P. Schwadron
Assistant Examiner—Richard Gerard
Attorney, Agent, or Firm—Phillips, Moore, Weissenberger, Lempio & Strabala

[57] ABSTRACT

An articulated handle comprises first, second and third arms pivotally attached together with each arm operatively connected to a respective directional control valve. The handle and first and second control valves, operatively connected to the first and second arms, are mounted on a tractor whereas a solenoid actuated third control valve is mounted on the frame of a bulldozer assembly. A pair of lift cylinders, interconnected between the tractor and frame, are operatively connected to the first control valve whereas tilt and angle cylinders, interconnected between the frame and a bulldozer blade, are operatively connected to the third control valve.

3 Claims, 2 Drawing Figures

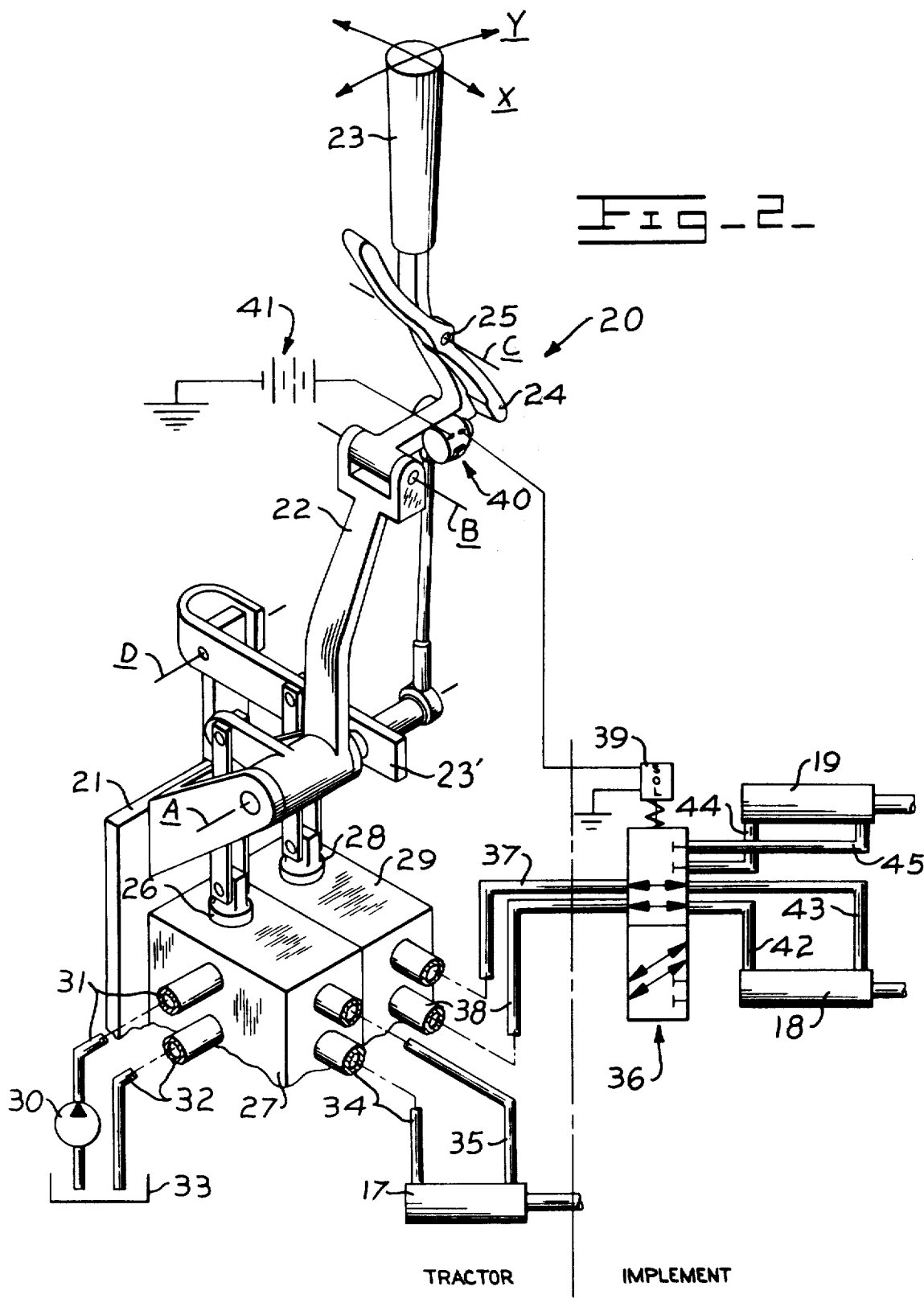

THREE-WAY LEVER CONTROL FOR ACTUATING A PLURALITY OF VALVES

CROSS-REFERENCE TO RELATED APPLICATION

This application is a divisional application of U.S. Patent Application Ser. No. 265,427, filed on June 23, 1972 by Robert Casey for "Three-Way Lever Control for Hydraulic Control Circuit" and now Pat. No. 3,795,280.

BACKGROUND OF THE INVENTION

Hydraulic control circuits for tractor-mounted bulldozer assemblies or the like comprise hydraulically actuated cylinders for performing various lifting, tilting and angling functions. Separate lever controls and associated control valves are normally mounted in the operator station of the tractor to communicate with the cylinders via a plurality of flexible hydraulic lines. Such individual lever controls require an operator that has an inordinately high degree of dexterity and alertness whereas the hydraulic lines are subject to high rates of failure since they are all normally positioned to extend between the tractor and bulldozer assembly. A partial solution to such problem is found in U.S. Pat. No. 3,512,453, assigned to the assignee of this application, which discloses a system for the actuation of hydraulic cylinders wherein a pilot pressure system is disposed entirely upon an implement.

SUMMARY OF THE INVENTION

An object of this invention is to provide an economical, compact and non-complex three-way lever control adapted to selectively actuate separate control valves and to further provide an integrated fluid circuit for selectively actuating separate cylinder means employed for an implement assembly mounted on a tractor.

The three-way lever control comprises an articulated handle having first, second and third arms pivotally attached together for selectively actuating separate control valves, either individually or simultaneously. In the preferred embodiment of this invention, the second arm has an electrical switch means mounted thereon in close proximity to the third arm for actuation thereby.

Another feature of this invention comprises the application of a fluid circuit means for selectively actuating various cylinder means employed on a tractor and implement assembly combination. In such combination, manual control means, preferably comprising the above three-way lever control, are mounted on the tractor. A control valve, preferably of the electrically actuated type, is mounted on a frame of the implement assembly and is operatively connected directly to the manual control means.

BRIEF DESCRIPTION OF THE DRAWINGS

Other objects of this invention will become apparent from the following description and accompanying drawings wherein:

FIG. 2 schematically illustrates an integrated hydraulic control circuit for actuating cylinders employed in the FIG. 1 tractor-bulldozer combination.

DETAILED DESCRIPTION

Figure 1:
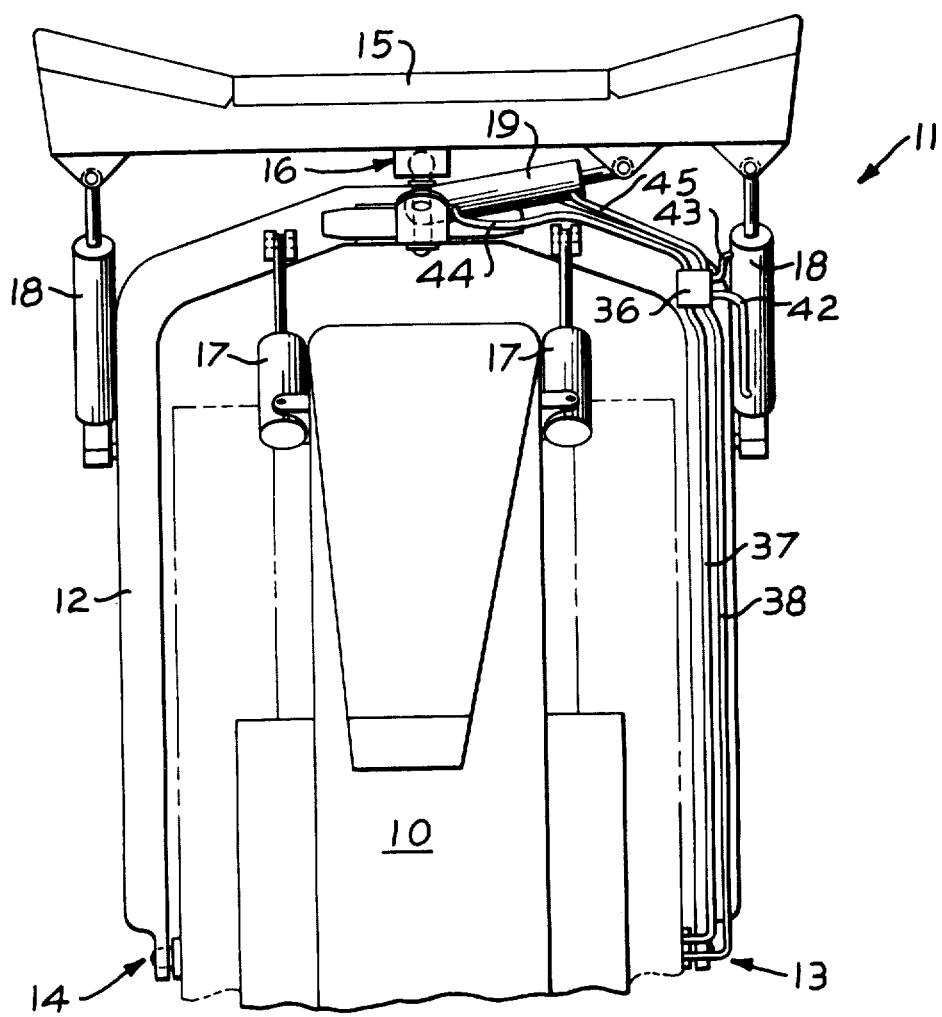
FIG. 1 is a partial top plan view of a tractor having a bulldozer assembly attached thereon.

FIG. 1 illustrates a tractor 10 having an implement assembly, such as a bulldozer assembly 11, mounted thereon. The bulldozer assembly comprises a C-frame 12 pivotally mounted on a frame of the tractor by universal ball and socket connections 13 and 14. A work implement, such as a bulldozer blade 15, is operatively connected to the frame by a standard universal ball and socket connection 16.

Lift or first cylinder means, comprising laterally spaced hydraulic cylinders 17 are operatively interconnected between the tractor and the frame. A tilt or second cylinder means 18 and an angle or third cylinder means 19 are operatively interconnected between the frame and the blade. Thus it can be seen that lift cylinder means 17 are adapted to selectively raise or lower the bulldozer assembly relative to the tractor, tilt cylinder means 18 is adapted to selectively tilt blade 15 relative to its normal vertically disposed position, and angle cylinder means 19 is adapted to angle the blade relative to frame 12.

Fluid circuit means for selectively actuating each of the above described cylinder means is schematically illustrated in FIG. 2. Such circuit means comprises manual control means having a three-way lever control 20 mounted on a stationary support 21. The lever control comprises an articulated handle having a first arm 22 pivotally mounted on the support for pivotal movement about a first axis A, a second arm 23 is pivotally mounted on the first arm for pivotal movement about a second axis B, disposed transversely relative to the first axis, and a third arm 24 pivotally mounted on the second arm by a pin 25 for movement about a third axis C, parallel to axis B.

A stem 26, forming an extension of a spool of a first three-way control valve 27, is pivotally connected to first arm 22 to reciprocate in response to pivoting of the first arm about axis A. A second stem 28, forming an extension of a spool of a second three-way control valve 29, is pivotally connected to second arm 23 to reciprocate in response to pivotal movements of the second arm about axis B. The second arm is pivotally connected to a lever 23' which pivots on support 21 about a fourth axis D. Such control arm is more fully described in U.S. patent application Ser. No. 261,606, filed on June 12, 1972, by Robert Casey for "Single Lever Control for Multi-Valve Operation".

The circuit means comprises a positive displacement pump 30 driven by the tractor's engine (not shown) to communicate pressurized fluid, preferably hydraulic oil, to valves 27 and 29 via an inlet conduit 31. A return conduit 32 also communicates with the valve to selectively return hydraulic oil to a tank 33 which is exhausted from the end of each cylinder which is not being pressurized. Selective actuation of three-way valve 27 communicates pressurized oil to the head or rod ends of cylinders 17 (one shown) via conduit 34 or 35.

Selective actuation of three-way valve 29 will communicate pressurized fluid to an electrically actuated third control valve 36 via flexible conduit 37 or 38.

Such control valve comprises a solenoid 39 operatively interconnected between an electrical switch means 40 mounted on second arm 23 of the handle and a normally retracted plunger connected to the valve spool of control valve 36. The switch means is normally open and is adapted to be closed by third arm 24 to move valve 36 to its upward position by energizing the solenoid by means of a battery 41. Third control valve 36 is operatively connected to the head and rod end of cylinder 18 by flexible conduits 42 and 43, respectively, whereas angle cylinder 19 has its head and rod ends operatively connected to valve 36 by means of flexible conduits 44 and 45, respectively.

Referring again to FIG. 1, it should be noted that valve 36 is mounted on frame 12 in close proximity to tilt cylinder 18 and angle cylinder 19. Flexible conduits 37 and 38 extend along one arm of frame 12 and constitute the sole hydraulic connection between tractor 10 and bulldozer assembly 11, across one pivot connection 13. If so desired, a suitable shroud (not shown) may be employed to enclose conduits 37 and 38 to protect same.

In operation, lift cylinders 17 are selectively extended or retracted by moving lever control 20 in the X direction (FIG. 2) to communicate pressurized oil thereto via valve 27 and conduit 34 to 35. The other conduit will exhaust oil from the cylinder in a conventional manner. Movement of the lever control in the Y direction will communicate pressurized oil from valve 29 to valve 36.

When solenoid 39 is not energized, valve 36 will remain in its illustrated lower, spring biased position to communicate such oil to extend or retract tilt cylinder 18, through either conduit 42 or 43 depending on the position of valve stem and spool 28. Depression of third handle 24 will close switch 40 to activate solenoid 39 to move the spool of valve 36 upwardly to communicate pressurized oil to either conduit 44 or 45 to selectively retract or extend cylinder 19, again depending on the position of valve stem and spool 28. The circuit is thus conditioned so that valve 36 is shifted only upon the continuous closing of switch 40, due to the normally infrequent need to adjust the angle of the bulldozer blade.

What is claimed is:

1. A three-way lever control adapted to actuate separate valves comprising a stationary support and an articulated handle having a first arm, adapted to actuate a first valve, pivotally mounted on said support for pivotal movement about a first axis, a second arm, adapted to actuate a second valve, pivotally mounted on said first arm for pivotal movement about a second axis disposed transversely relative to said first axis, and a third arm, adapted to actuate a third valve, pivotally mounted on a side of said second arm for pivotal movement about a third axis disposed at least generally parallel to said second axis, said third arm being pivotally mounted at a mid-portion thereof on said second arm and comprising a first lever portion extending upwardly along said second arm for simultaneous actuation therewith and a second lever portion extending downwardly in close proximity to an electrical switch means mounted on said second arm whereby movement of said second lever portion upon movement of said first lever portion will engage and actuate said electrical switch means.

2. The invention of claim 1 further comprising first and second control valves each having a stem reciprocally mounted therein, means pivotally interconnecting each of said first and second arms with a respective one of said valve stems whereby pivotal movement of said handle about said first axis will reciprocate one of said valve stems and pivotal movement of said handle about said second axis will reciprocate the other one of said valve stems.

3. The invention of claim 1 further comprising an electrically actuated third control valve operatively connected to said switch means.

* * * * *